United States Patent
Fay et al.

(10) Patent No.: US 9,253,518 B2
(45) Date of Patent: Feb. 2, 2016

(54) ON-DEMAND ACCESS TO SCHEDULED CONTENT

(71) Applicant: Sony Corporation, Tokyo (JP)

(72) Inventors: Luke Fay, San Diego, CA (US); Peter Shintani, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/963,111

(22) Filed: Aug. 9, 2013

(65) Prior Publication Data

US 2014/0137153 A1 May 15, 2014

Related U.S. Application Data

(60) Provisional application No. 61/724,583, filed on Nov. 9, 2012.

(51) Int. Cl.
| | |
|---|---|
| H04N 21/258 | (2011.01) |
| H04N 21/472 | (2011.01) |
| H04N 21/61 | (2011.01) |
| H04N 21/658 | (2011.01) |
| H04N 21/81 | (2011.01) |
| H04N 21/858 | (2011.01) |
| H04N 21/262 | (2011.01) |
| H04N 21/462 | (2011.01) |
| H04N 21/422 | (2011.01) |

(52) U.S. Cl.
CPC ....... *H04N 21/25866* (2013.01); *H04N 21/472* (2013.01); *H04N 21/6175* (2013.01); *H04N 21/6581* (2013.01); *H04N 21/8173* (2013.01); *H04N 21/8586* (2013.01); *H04N 21/26283* (2013.01); *H04N 21/42209* (2013.01); *H04N 21/462* (2013.01)

(58) Field of Classification Search
CPC ............... H04N 21/26283; H04N 21/42209; H04N 21/462

See application file for complete search history.

(56) References Cited

U.S. PATENT DOCUMENTS

| | | |
|---|---|---|
| 6,675,385 B1 | 1/2004 | Wang |
| 2003/0177495 A1 | 9/2003 | Needham et al. |
| 2004/0237108 A1 | 11/2004 | Drazin et al. |
| 2009/0260038 A1 | 10/2009 | Acton et al. |
| 2011/0075990 A1 | 3/2011 | Eyer |
| 2011/0088075 A1 | 4/2011 | Eyer |
| 2011/0243536 A1 | 10/2011 | Eyer |
| 2011/0246488 A1 | 10/2011 | Eyer |

(Continued)

OTHER PUBLICATIONS

U.S. Appl. No. 13/559,188, filed Jul. 26, 2012, Kitazato.

(Continued)

*Primary Examiner* — Nathan Flynn
*Assistant Examiner* — James R Marandi
(74) *Attorney, Agent, or Firm* — Oblon, McClelland, Maier & Neustadt, L.L.P.

(57) ABSTRACT

A method is provided for a reception apparatus to access content. The method includes outputting a distribution schedule for a plurality of content and receiving a selection of one of the plurality of content for which distribution started before or starts after a current time. At least one processor of the reception apparatus determines whether on-demand access is requested for the selected content. When on-demand access is determined to be requested for the selected content, a request for the selected content is sent over a first communication medium and the selected content is received via a second communication medium.

19 Claims, 12 Drawing Sheets

(56) References Cited

U.S. PATENT DOCUMENTS

| | | |
|---|---|---|
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Kitazato et al. |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |

OTHER PUBLICATIONS

U.S. Appl. No. 13/587,975, filed Aug. 17, 2012, Kitazato.
U.S. Appl. No. 13/593,554, filed Aug. 24, 2012, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.
U.S. Appl. No. 13/934,581, filed Jul. 3, 2013, Eyer.
U.S. Appl. No. 13/934,549, filed Jul. 3, 2013, Fay et al.
U.S. Appl. No. 13/934,615, filed Jun. 3, 2013, Eyer.
U.S. Appl. No. 13/934,924, filed Jul. 3, 2013, Yamagishi.
U.S. Appl. No. 13/934,473, filed Jul. 3, 2013, Yamagishi.
U.S. Appl. No. 13/955,130, filed Jul. 31, 2013, Fay.
International Search Report and Written Opinion issued Apr. 24, 2014 in Corresponding PCT/US13/666881.

FIG. 8

|  | 7:08 pm | | | |
|---|---|---|---|---|
| 802 | | | | |
| Program Description 804 | | | Preview 806 | |
| | | | | 810 |
| Today | << 8:30 pm | 9:00 pm | 9:30 pm | 10:00 pm >> |
| 4-1 | 30 Rock | Up All Night | The Office | Rock Center With Brian Williams >> |
| 5-1 | << MLB Playoff Game. (Live) | | | |
| 7-1 | << Last Resort | Grey's Anatomy | | Scandal >> |
| 9-1 | Two and a Half Men | Person of Interest | | Elementary >> |
| 20-1 | << White Collar | White Collar | | The Big Bang Theory |

|  | 7:08 pm | | | |
|---|---|---|---|---|
| Program Description | | | Preview | |
| Today | << 8:30 pm | 9:00 pm | 9:30 pm | 10:00 pm >> |
| 4-1 | 30 Rock | Up All Night | The Office | Rock Center With Brian Williams >> |
| 5-1 | << M | Record? | | |
| 7-1 | << La | View Now? | | Scandal >> |
| 9-1 | Two and a Half Men | Person of Interest | | Elementary >> |
| 20-1 | << White Collar | White Collar | | The Big Bang Theory |

| | 7:08 pm | | | |
|---|---|---|---|---|
| Program Description | | | Preview | |
| Today | << 8:30 pm | 9:00 pm | 9:30 pm | 10:00 pm >> |
| 4-1 | 30 Rock | Up All Night | VIEW NOW? | Rock Center With Brian Williams >> |
| 5-1 | << MLB Playoff Game. (Live) | | | |
| 7-1 | << Last Resort | Grey's Anatomy | | Scandal >> |
| 9-1 | Two and a Half Men | Person of Interest | | Elementary >> |
| 20-1 | << White Collar | White Collar | | The Big Bang Theory |

FIG. 10

| | 7:08 pm | | | |
|---|---|---|---|---|
| Program Description | | | Preview | |
| Today | << 8:30 pm | 9:00 pm | 9:30 pm | 10:00 pm >> |
| 4-1 | 30 Rock (*) | Up All Night (*) | The Office (*) | Rock Center With Brian Williams >> |
| 5-1 | << MLB Playoff Game. (Live) | | | |
| 7-1 | << Last Resort | Grey's Anatomy (*) | | Scandal >> |
| 9-1 | Two and a Half Men | Person of Interest | | Elementary >> |
| 20-1 | << White Collar | White Collar | | The Big Bang Theory |

FIG. 11

ON-DEMAND ACCESS TO SCHEDULED CONTENT

CROSS-REFERENCE TO RELATED APPLICATIONS

This application claims the benefit of priority to U.S. provisional application No. 61/724,583, filed Nov. 9, 2012, the entire contents of which is incorporated herein by reference in its entirety.

BACKGROUND OF THE INVENTION

1. Field of the Invention

Embodiments described herein relate generally to content for scheduled distribution. More particularly, embodiments described herein relate generally to on-demand access to content that is scheduled for distribution at a predetermined time.

2. Background

Modern televisions and set top boxes are capable of performing numerous functions in addition to receiving and presenting television broadcasts. One function is the display of an electronic programming guide (EPG), which provides information on when television programs are scheduled to be aired.

SUMMARY OF THE INVENTION

According to an embodiment of the present disclosure, there is provided a method of a reception apparatus for accessing content. The method includes outputting a distribution schedule for a plurality of content, and receiving a selection of one of the plurality of content for which distribution started before or starts after a current time. At least one processor of the reception apparatus determines whether on-demand access is requested for the selected content. When on-demand access is determined to be requested for the selected content, a request for the selected content is sent over a first communication medium. The selected content, which is provided in response to the request for the selected content, is received via a second communication medium.

Further, according to an embodiment of the present disclosure, there is provided a non-transitory computer-readable storage medium having instructions embedded therein, which, when executed by a computer, cause the computer to perform the method of the reception apparatus discussed above.

According to an embodiment of the present disclosure, there is provided a reception apparatus. The reception apparatus includes a first communication interface, at least one processor, and a second communication interface. The at least one processor is configured to output a distribution schedule for a plurality of content, and receive a selection of one of the plurality of content for which distribution started before or starts after a current time. At least one processor is further configured to determine whether on-demand access is requested for the selected content, and send a request for the selected content over a first communication medium, via the first communication interface, when the at least one processor determines on-demand access is requested for the selected content. The second communication interface is configured to receive the selected content provided via the second communication medium in response to the request for the selected content.

According to an embodiment of the present disclosure, there is provided an information providing apparatus. The information providing apparatus includes a memory and at least one processor. The memory is configured to store a triggered declarative object (TDO) associated with content which is distributed according to a predetermined schedule. The at least one processor is configured to provide the TDO to a reception apparatus via a communication interface. The TDO defines a location from which on-demand access to the content can be requested

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8-11 illustrate exemplary electronic programming guide (EPG) interfaces;

DETAILED DESCRIPTION

Figure 1:
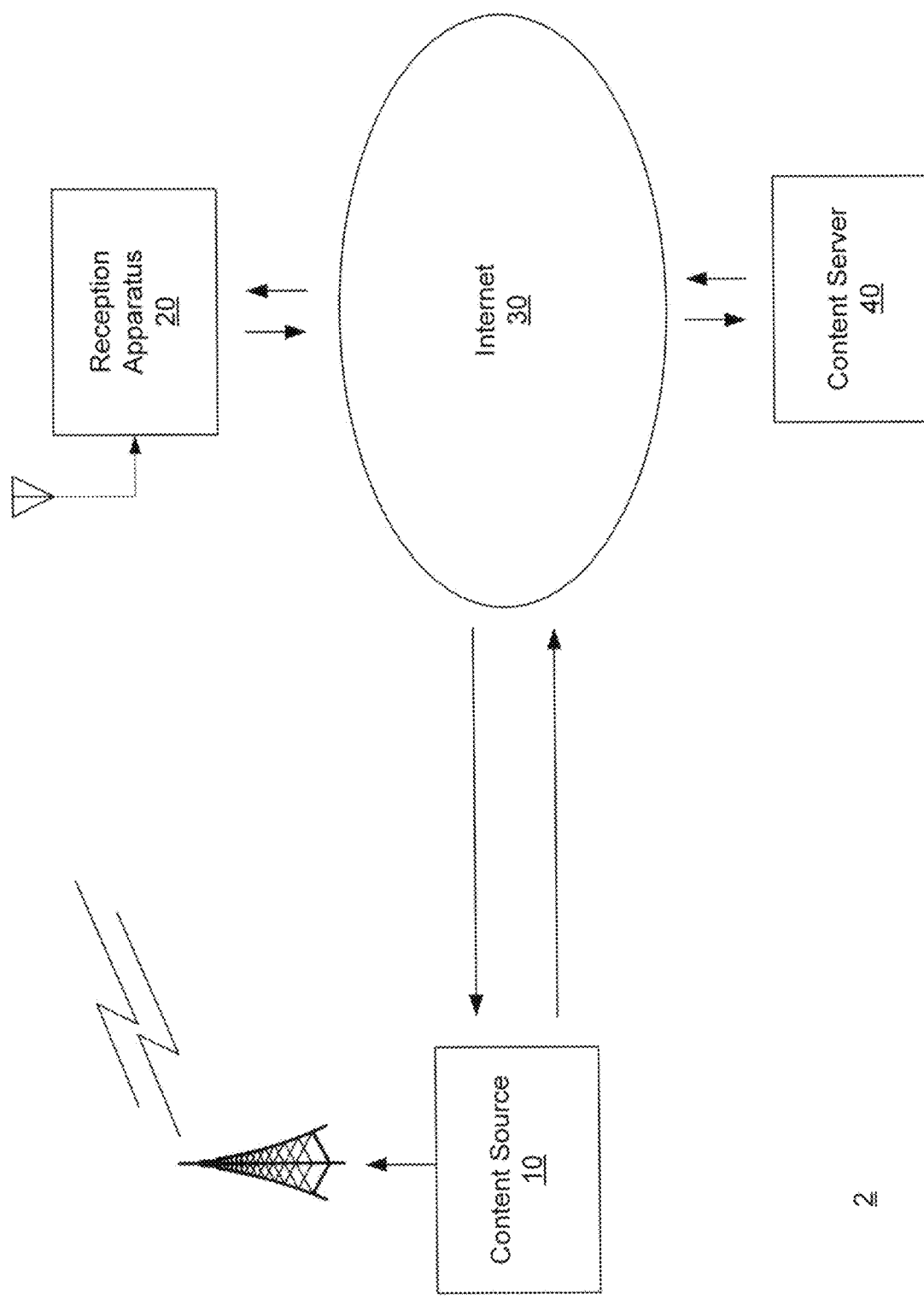
FIG. 1 illustrates an exemplary broadcast system.

While the present disclosure is susceptible of embodiment in many different forms, there is shown in the drawings and will herein be described in detail specific embodiments, with the understanding that the disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system. The term "non-transitory", as used herein, is a limitation of the medium itself (i.e., tangible, not a signal) as opposed to a limitation on data storage persistency (e.g., RAM vs. ROM).

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the disclosure are directed to on-demand access to one or more content that is distributed according to a schedule. The content can be any data such as any one or a combination of media content such as television programs, movies, events (e.g., sporting events), music, radio programs, printed publications (e.g., magazines), etc.; and non-media content such as software applications, software updates, data files, etc.

Further, the on-demand content can be any one or a combination of past content (i.e., content that was previously distributed), current content (i.e., content for which distribution is in progress), and future content (i.e., content scheduled to be distributed in the future). Availability of past, current, and future content is based on whether the content is pre-recorded such as movies. For example, past, current, and/or future content are available when the content is stored and ready for immediate distribution by streaming or download. Certain content, such as live content, cannot be available on demand until the content has already started.

FIG. 1 illustrates an exemplary broadcast system 2 for providing access to past, current, and/or future content on demand in a digital television environment. The broadcast system 2 includes a content source 10, a reception apparatus 20, and an optional content server 40. The content server 40 is incorporated into the content source 10 in other embodiments. Further, although FIG. 1 illustrates a single content source 10, reception apparatus 20, and content server 40, it should be understood that a plurality of content sources 10, reception apparatuses 20, and/or content servers 40 may be included in the broadcast system 2.

In one embodiment, the content source 10 broadcasts digital television signals in accordance with standards set, for example, by the Advanced Television Systems Committee (ATSC) such as ATSC standard A/53, which is incorporated herein by reference in its entirety. For example, the content source 10 broadcasts content using a broadcast tower via studio to transmitter link (STL).

The content source 10 provides content to the reception apparatus 20 according to a predetermined schedule. The schedule defines, for example, the time and day each content is broadcast. In one embodiment, the content provided by the content source 10 includes one or more television content, without regard to whether the content is a movie, sporting event, segment of a multi-part series, news broadcast, etc. Further, the content provided by the content source 10 may also include advertisements, infomercials, and other program-like content which may not be reported as a program in an EPG.

The content source 10 provides the content to the reception apparatus 20 via a terrestrial broadcast (e.g., a digital television broadcast). In the case of audio/video content, the content is divided into a video elementary stream (ES) and an audio ES corresponding to the video and audio portions of the content. The video ES and audio ES are multiplexed with other data to form a broadcast multiplex, such as an MPEG-2 Transport Stream (TS). In other embodiments, the content source 10 provides the content via one or a combination of the terrestrial broadcast, a satellite broadcast, a cable television transmission, cellular network, and other data communication networks such as a local area network (LAN), wide area network (WAN), or the Internet 30.

In one embodiment, the content source 10 includes a memory to store a window of content. The window of content includes any one or a combination of past content, current content, and future content. For example, the content source 10 stores content that has already been, and/or is currently being, broadcast for access on demand. The content can be stored in any form by the content source 10. For example, the content source 10 may store a copy of the originally broadcasted TS, or the content may be stored separately, in the memory for subsequent access by one or more users. Further, the content source 10 may be configured to store future content in the memory, prior to its scheduled broadcast time, for access on demand. In other embodiments, the window of content may be stored at a remote location such as in the content server 40, a cloud-based storage system and the like.

The reception apparatus 20 is configured to receive content provided by one or more content sources 10 according to one or more distribution schedules, and to provide access to scheduled content on demand when available. In one embodiment, the reception apparatus 20 is configured to receive digital television content, such as a digital television receiver that is connected to or incorporated into a television set. However, the reception apparatus 20 can be any device that is capable of receiving content that is distributed according to a schedule.

The reception apparatus 20 may be configured to provide on-demand access to the scheduled content using a user interface that provides a content distribution schedule such as a EPG, a user interface that is displayed during a commercial for the scheduled content, a user interface that is provided by the content source 10 for which content is being received, etc.

Access to scheduled content on demand may be subject to various billing arrangements. For example, the content may be provided free of charge when the user is subscribed to an on-demand service provided by the content source 10, the user consents to receiving targeted advertising that is based on personal data of the user, etc. In other embodiments, the user is charged a fee to access the scheduled content on demand. For example, the user may pay a fee for each requested content In the case of digital television content transmitted in accordance with ATSC standard A/53, fees can be assessed using one or a combination of the Purchase Item Table (PIT) and Purchase Terms and Channel Table (PTCT) as defined in ATSC standard A/103, which is incorporated by reference in its entirety. The PIT has entries which define a purchase item which can be service or content. This can be thought of as a list of possible tagged items offered for sale. The PTCT contains terms of a purchase (price) and channel entries providing contact information. These two tables are related and can reference each other to provide billing information to broadcasters when a purchase is made. These tables are referenced for sending information back to the content source provider (e.g., content source 10).

In some embodiments, the on-demand content is subject to digital rights management (DRM), which is handled by the reception apparatus 20 or embedded into the on-demand content provided to the reception apparatus 20. For example, the reception apparatus 20 can prohibit the transfer of received on-demand content to another device, limit the number of times the on-demand content can be played back, etc.

In some embodiments, each content which is available on demand is associated with a TDO trigger and TDO. The TDO trigger identifies a particular TDO to be executed when a request for associated on-demand content is received by the reception apparatus 20, when a user is to be notified of the availability of the on-demand content, etc.

In one embodiment, the TDO trigger includes content and TDO identifiers. The content identifier is used by the reception apparatus 20 to determine which content the TDO trigger is associated with, and the TDO identifier is used by the reception apparatus 20 to determine which TDO to execute when on-demand content is requested. Further, in one embodiment, the TDO trigger references the location where an associated TDO may be acquired, such as a file name or identifier for a file that has already been downloaded via non-real-time (NRT) services.

The TDO is a downloadable software object. Generally, such objects have declarative content (e.g., text, graphics, scripts, and audio) whose function and behavior is tied in some way to the content it is associated with. The TDO can be stored in the reception apparatus 20 in advance or retrieved when an associated TDO trigger is activated by a user requesting on-demand content. Various standards bodies may define associated available behaviors, appearance, trigger actions, and transport methods for content and metadata for a TDO.

In some embodiments, the TDO controls the manner in which on-demand content can be accessed by a user and/or how the user is notified of the availability of the on-demand content. For example, the TDO defines or retrieves one or a combination information on how to assess a fee for the on-demand content (e.g., by presenting an interface for the user to enter billing information, retrieving and forwarding the user's account information from the reception apparatus 20, etc.), how the request for the on-demand content is sent, basic content information, when the content is scheduled to be distributed, a content identifier, whether any capability information of the reception apparatus 20 (e.g., whether the reception apparatus 20 can support 720p, 1080i, 480i) should be provided with the content request, whether different versions of the content are available (e.g., different languages, video qualities, audio qualities, etc.), whether to send all or a portion of a user's Preferences Demographics and Interests (PDI) table, and whether and any other information that can be used to identify the requested content or otherwise. Based on the type of information, the fee can be retrieved from the reception apparatus 20 or another location such as the content source 10.

In other embodiments, content which are available on demand are associated with TDOs but not TDO triggers. Further, each content may be associated with a different or same TDO. Alternatively, a group of content may be associated with the same TDO. For example, all on-demand content available from the same content source 10 may be requested via the same TDO.

When all or a subset of on-demand content provided by a particular content source is associated with the same TDO, the TDO is configured to provide a request that contains sufficient information to identify the particular on-demand content requested. For example, the TDO may be configured to send one or a combination of a content identifier, broadcast time/day, virtual channel number, or any other information that can be used to uniquely identify the requested on-demand content. Further, when the same TDO is associated with a subset of the on-demand content provided by the particular content source, a different TDO may be associated with each of past content, current content, and future content. In another example, one TDO may be associated with past and current content while another TDO is associated with future content. Such an arrangement may be useful in a case where past content, current content, and future content are to be requested from different locations.

Figure 2:
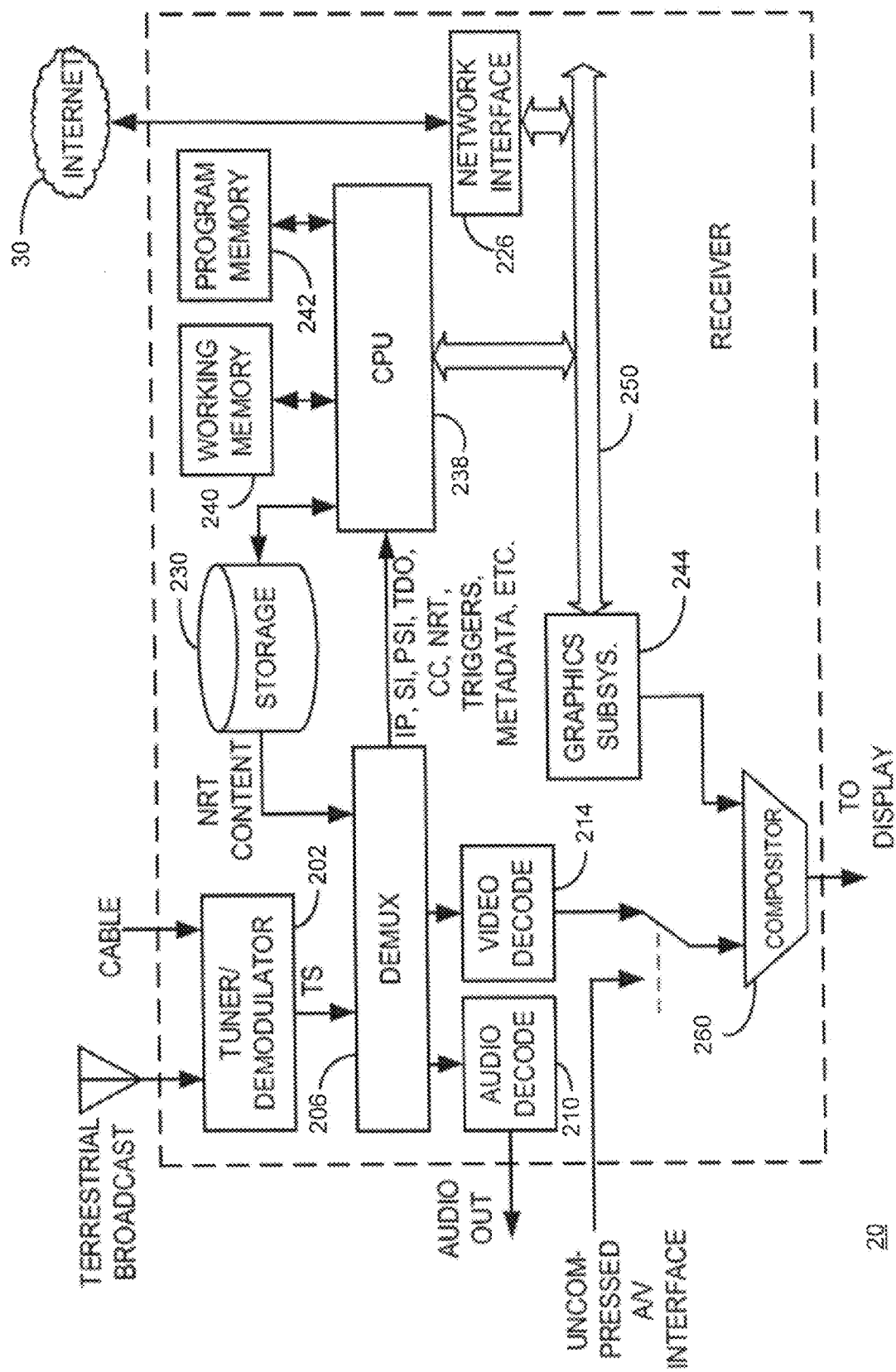
FIG. 2 is a block diagram of an exemplary reception apparatus.

FIG. 2 illustrates an embodiment of the reception apparatus 20. The reception apparatus 20 is a digital television receiver device that is incorporated into a television set, a set top box, or any other device configured to receive television content.

The reception apparatus 20 includes a tuner/demodulator 202, which receives content from one or more content sources (e.g., content source 10) via, for example, a terrestrial broadcast, a cable television transmission, or a satellite broadcast. The tuner/demodulator 202 receives a transport stream (TS), which is demultiplexed by the demultiplexer 206 into audio and video (A/V) streams. The audio is decoded by an audio decoder 210 and the video is decoded by a video decoder 214. Further, uncompressed A/V data may be received via an uncompressed A/V interface (e.g., a HDMI interface).

In one embodiment, the TS includes supplemental data such as one or a combination of closed caption data, a triggered declarative object (TDO), a TDO trigger, a virtual channel table, EPG data, etc. The supplemental data are separated out by the demultiplexer 206. However, the A/V content and/or the supplemental data may be received via the Internet 30 and a network interface 226.

A storage unit 230 is provided to store non-real time or Internet-delivered content such as Internet Protocol Television (IPTV). The stored content can be played by demultiplexing the content stored in the storage unit 230 by the demultiplexer 206 in a manner similar to that of other sources of content. The storage unit 230 may also store any supplemental data acquired by the reception apparatus 20.

The reception apparatus 20 generally operates under control of at least one processor, such as CPU 238, which is coupled to a working memory 240, program memory 242, and a graphics subsystem 244 via one or more buses (e.g., bus 250). The CPU 238 receives closed caption data from the demultiplexer 206 as well as any other supplemental data used for rendering graphics, and passes appropriate instructions and data to the graphics subsystem 244. The graphics outputted by the graphics subsystem 244 are combined with video images by the compositor and video interface 260 to produce an output suitable for display on a video display.

Further, the CPU 238 operates to carry out functions of the reception apparatus 20 including the processing of TDO triggers, TDOs, EPG data, etc. For example, the CPU 238 operates to execute script objects (control objects) contained in the TDO, its trigger(s), etc., using for example a Declarative Object (DO) Engine stored in the program memory 242.

Although not illustrated in FIG. 2, the CPU 238 may be coupled to any one or a combination of the reception apparatus 20 resources to centralize control of one or more functions. In one embodiment, the CPU 238 also operates to oversee control of the reception apparatus 20 including the tuner/demodulator 202 and other television resources.

Figure 3:
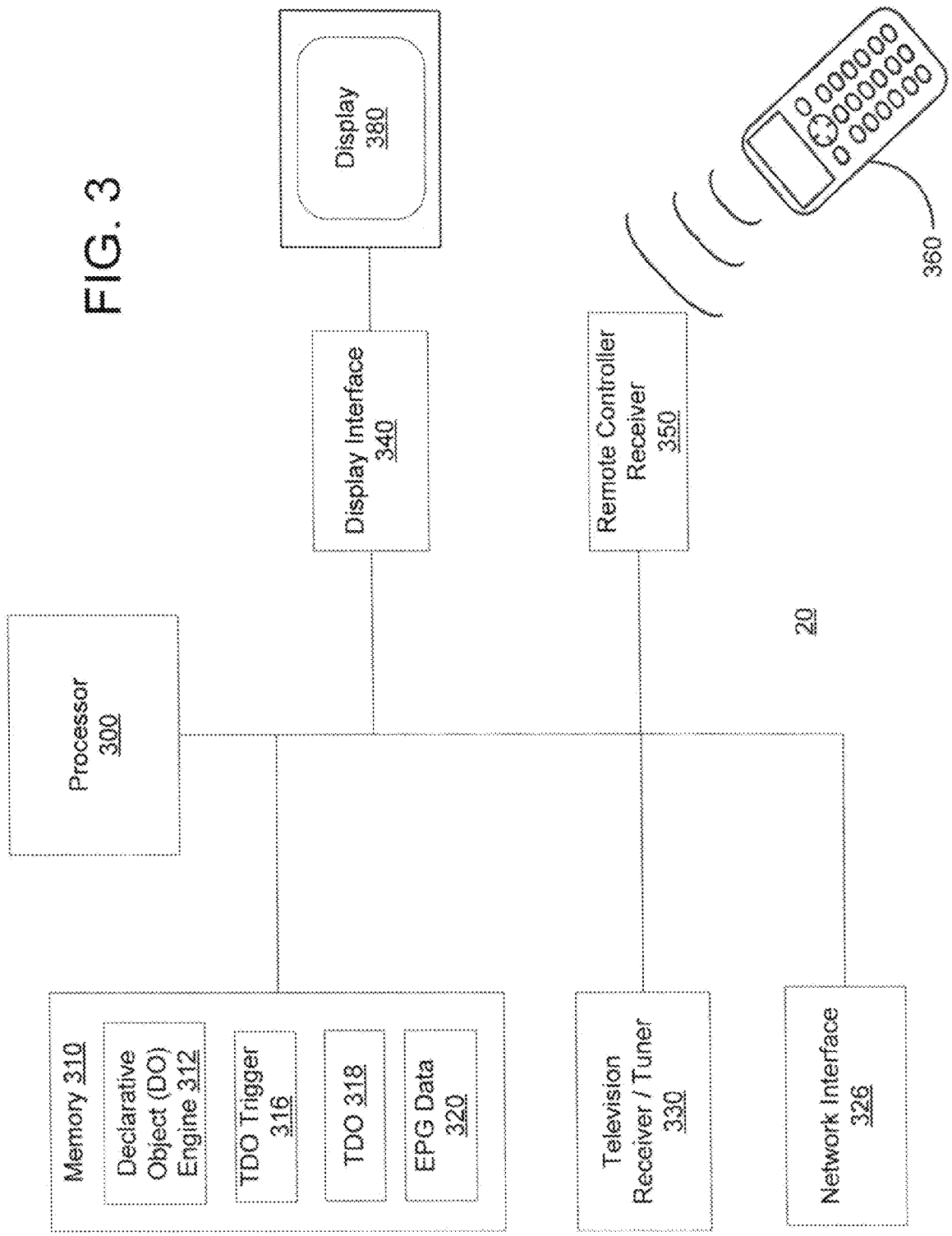
FIG. 3 is a processor-centric block diagram of an exemplary reception apparatus.

A more processor-centric view of the reception apparatus 20 is illustrated in FIG. 3. Storage 230 and memories 240, 242 are depicted collectively as memory 310. Further, at least one processor 300 includes one or more processing units such as CPU 238. Similarly, the various demodulators, decoders, etc., that initially process digital television signals are collectively depicted as television receiver/tuner 330. The reception apparatus 20 further includes a remote controller 360 which communicates with a remote controller receiver interface 350.

Additionally, a display 380 is connected to a display interface 340, which includes for example the uncompressed A/V interface and/or compositor 260, and is either a display integral to the reception apparatus 20 as in a television set or a connected display device as in the case where the reception apparatus 20 is integrated into a set-top box.

Memory 310 contains various functional program modules and data. The memory 310 stores the data used by the reception apparatus 20. The memory 310 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. Any received TDO triggers 316, TDOs 318, and/or EPG data 320 can be stored in the memory 310.

In one embodiment, the TDO execution is carried out by a Declarative Object (DO) Engine 312, which is also stored in the memory 310. The TDO, when executed by the DO Engine 312, provides access to scheduled content on demand.

Figure 4:
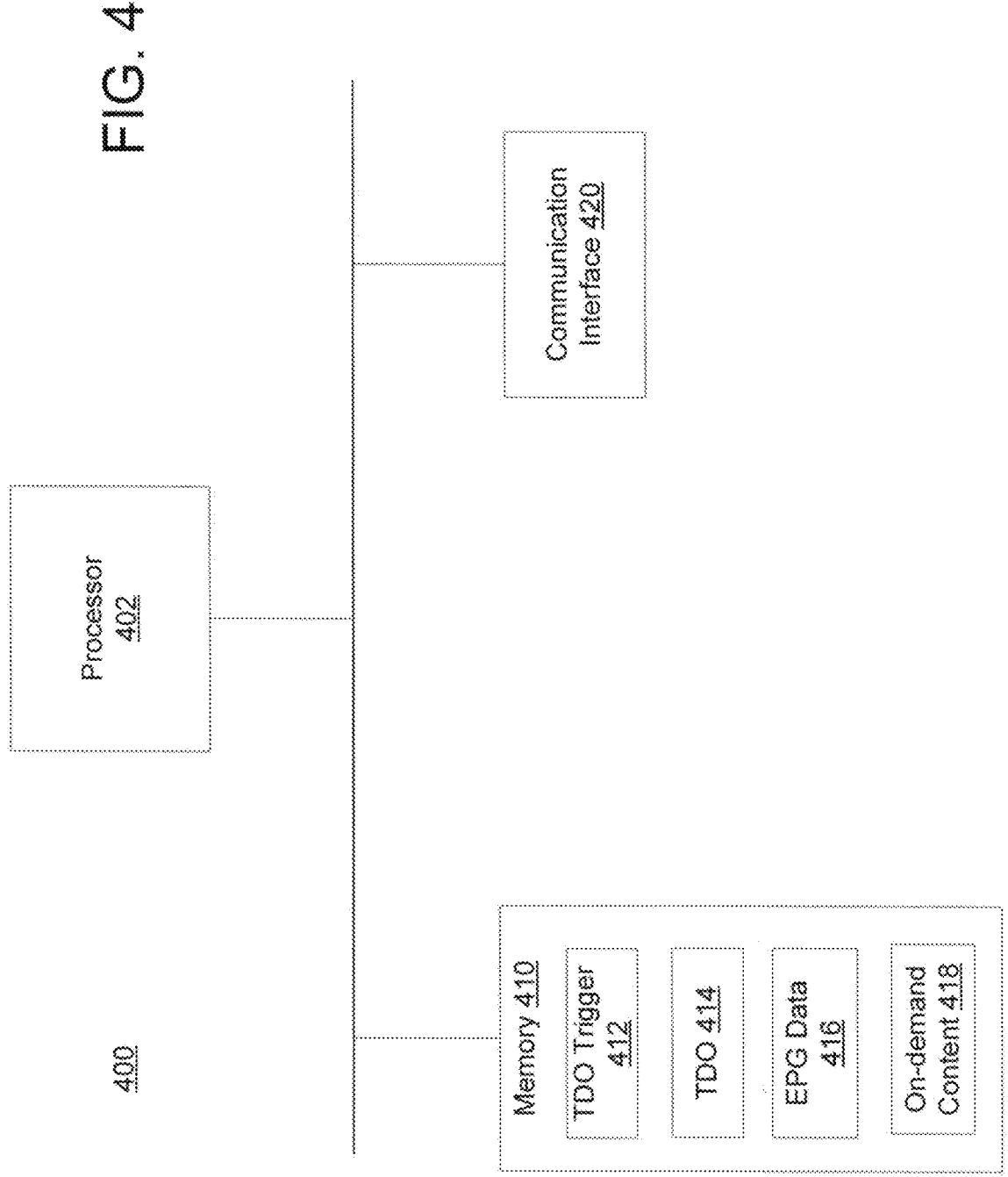
FIG. 4 is a processor-centric block diagram of an exemplary information providing apparatus.

FIG. 4 illustrates an exemplary information providing apparatus 400. The information providing apparatus 400 may be incorporated in the content source 10, the content server 40, or as a stand alone unit. The information providing apparatus 400 includes at least one processor 402, a memory 410, and a communication interface 420. In one embodiment, the memory 410 is similar to the memory 310 described with respect to FIG. 3. The memory 410 stores one or a combination of TDO triggers 412, TDOs 414, EPG data 416, and on-demand content 418 to be provided to the reception apparatus 20. The at least one processor 402 is configured to provide any of the data stored in the memory 410 automatically or in response to a request for the data received from the reception apparatus 20.

The communication interface 420 is configured to interface with a communication medium used to provide the data stored in the memory 410 to the reception apparatus 20. In one embodiment, the communication interface 420 is a network interface when the data is provided over the Internet. In another embodiment, the communication interface 420 provides the data for insertion into the TS for broadcast to the reception apparatus 20. For example, the communication interface 420 interfaces with a multiplexer in the content source 10.

Figure 5:
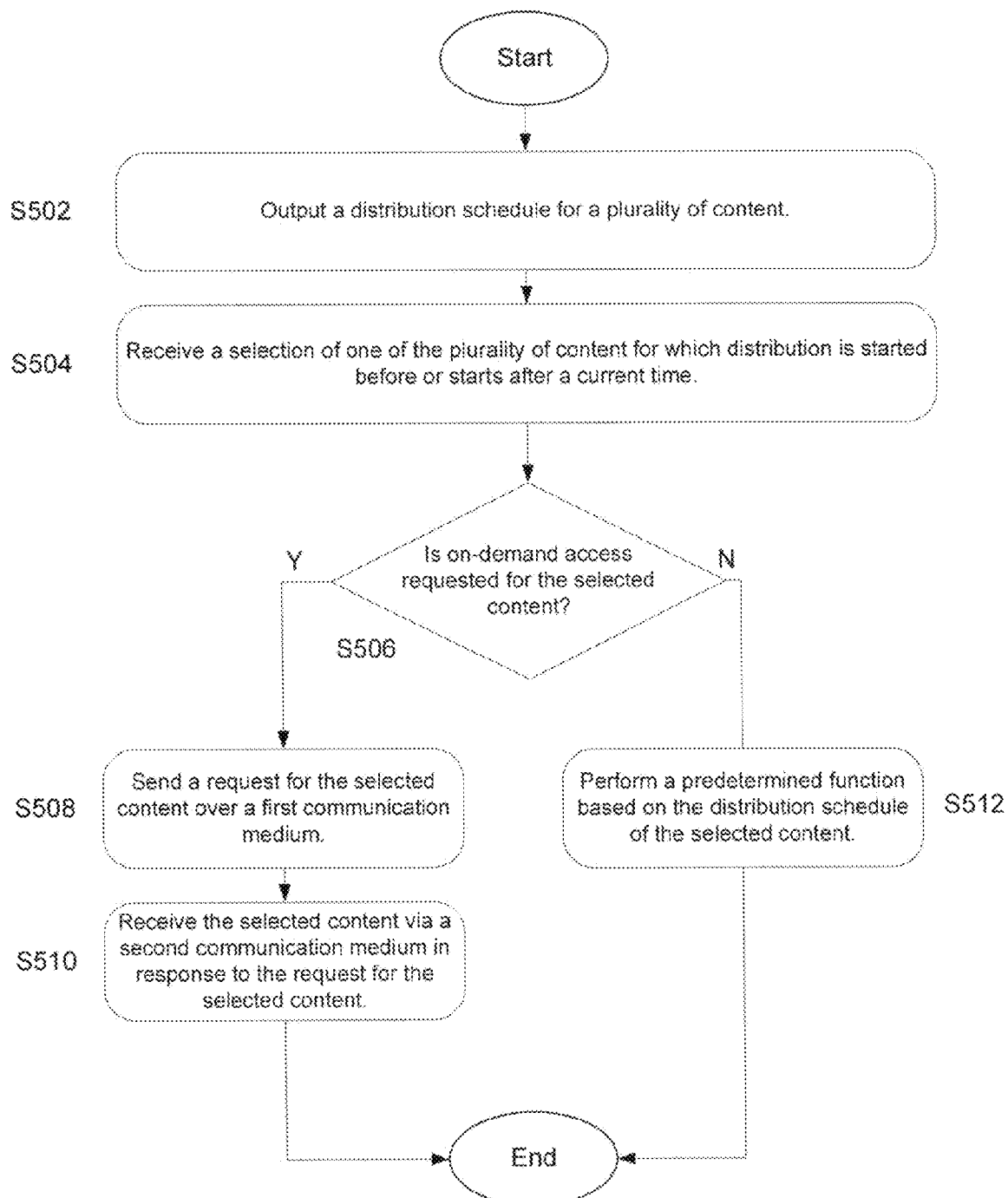
FIG. 5 illustrates a flow diagram of an exemplary method for accessing content.

FIG. 5 illustrates a flow diagram of an exemplary method for accessing content on demand. In step S502, a distribution schedule for a plurality of content is output to a user. For example, the processor 300 of the reception apparatus 20 causes the distribution scheduled to be displayed to a user on the display 380. The distribution schedule may be displayed in response to a request received from the user via the remote controller receiver 350. The user browses the distribution schedule to identify content of interest. In one embodiment, the distribution schedule is displayed in an EPG.

In step S504, the reception apparatus 20 receives a selection of one of the plurality of content for which distribution started before or after a current time, for example, via the remote controller receiver 350. In step S506, the processor 300 determines whether on-demand access is requested for the selected content. When the processor 300 determines that on-demand access is requested, in step S508, the reception apparatus 20 sends a request for the selected content over a first communication medium via, for example, the network interface 326. For example, the reception apparatus 20 sends the request to a content source 10 or content server 40. In step S510, the reception apparatus 20 receives the selected content via a second communication medium in response to the request for the selected content. For example, the reception apparatus 20 receives the selected content via the second communication medium using the television receiver/tuner 330 or network interface 326.

In one embodiment, when the processor 300 determines that on-demand content is requested for the selected content, the processor 300 determines whether the selected content is available locally (e.g., from a connected digital video recorder or internal memory) prior to sending a request for the selected content over the first communication medium. In this case, the processor 300 can avoid situations where the user requests an on-demand copy of the content when a copy of the content is already available to the user because the selected content has or is being recorded or the selected content has been buffered in the reception apparatus 20.

When the processor 300 determines that on-demand access is not requested from the selected content, in step S512, the processor 300 performs a predetermined function based on the distribution schedule of the selected content. For example, the processor 300 instructs the reception apparatus 20 to tune to a channel associated with the selected content, schedules the selected content for recording, plays back a local recording of the selected content, etc.

Figure 6:
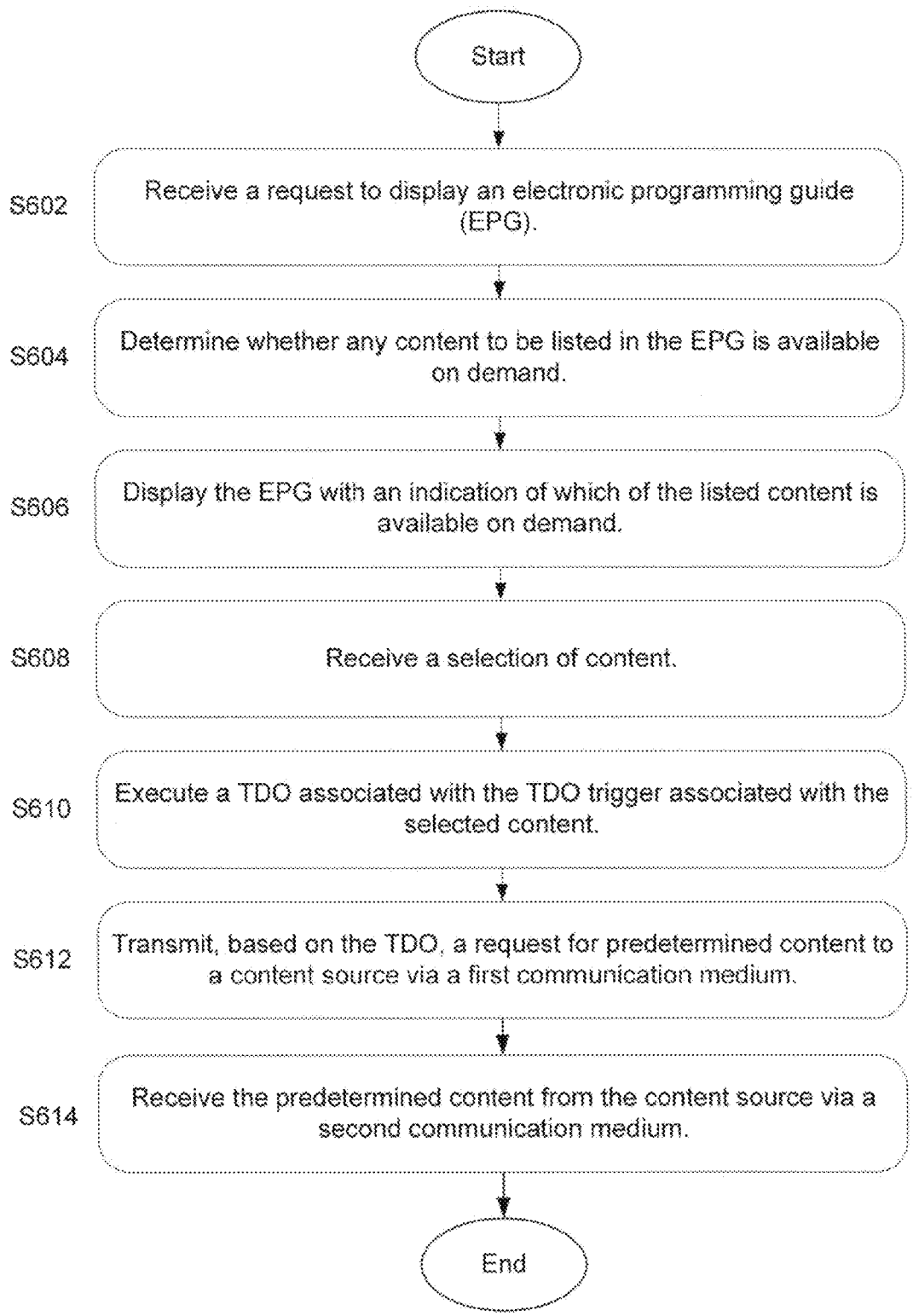
FIG. 6 illustrates a flow diagram of another exemplary method for accessing content.

FIG. 6 illustrates a flow diagram of an exemplary method for accessing content on demand using an EPG. The EPG may be acquired from the Internet or a broadcast or other transmission. For example, the EPG can be acquired from a digital television signal using the Program and System Information Protocol (PSIP) protocol defined in ATSC standard A65:2009 or the TV Guide on Screen signal.

In step S602, the reception apparatus 20 receives a request to display the EPG via the remote controller receiver 350, for example. Depending on the embodiment, the request may be designated by a user pressing a dedicated button on the remote controller 360, via a menu selection, etc. In response to receiving the request, in step S604, the processor 300 determines whether any content to be listed in the EPG is available on demand. The determination may be performed for only content that is to be immediately listed (e.g., a first page), or a subset or all content identified in the EPG.

The processor 300 is configured to determine whether any content to be listed in the EPG is available on demand according to any one or a combination of different methods. In some embodiments, the processor 300 determines whether content is available on demand based on information included in the EPG data. For example, the EPG data may include an on-demand availability flag that is included in a dedicated field or appended to an existing EPG field (e.g., the program description) for each content to be listed. In another embodiment, the EPG includes a TDO trigger for each content that is available on demand and the processor 300 determines on-demand content availability based on the presence of the TDO trigger.

In other embodiments, the processor 300 determines whether the content is available on demand based on on-demand availability information that is separate from the EPG data. For example, the processor 300 determines whether an associated TDO trigger or TDO is stored in the memory 310 for each content to be listed. The processor 300 determines whether an associated TDO trigger or TDO is stored for particular content by comparing a TDO trigger identifier or TDO identifier defined in the TDO trigger or TDO, respectively, with content identifying information. For example, the processor 300 matches an associated TDO trigger or TDO using a content identifier included in the EPG data.

In one embodiment, the TDOs are self-executing and executed by the user via the EPG without requiring a separate TDO trigger to trigger execution.

In step S606, the processor 300 causes the display interface 340 to display the EPG on the display 380. In one embodiment, the EPG displayed on the display 380 includes a visual indication of which of the listed content is available on demand (e.g., based on whether the content is determined to be associated with a TDO trigger, TDO, etc.), as illustrated for example in FIG. 11. In other embodiments, the EPG indicates whether a particular content is available on demand after the particular content is selected by the user via the remote controller 360, for example, as illustrated in FIGS. 9 and 10.

A user of the reception apparatus 20 browses the EPG to identify content of interest. In one embodiment, the EPG lists a content schedule corresponding to only a subset of available EPG data at any given time. However, the content schedule for all available EPG data may be displayed concurrently when, for example, the resolution of the display or the number of items to be listed permits concurrent viewing of the entire content schedule. When only the content schedule for the subset is displayed, the EPG is configured to display additional content schedules in response to user inputs. When the user identifies a content of interest, the user selects the content of interest by, for example, pressing "Enter" on the remote controller 360. The processor 300 receives the user selection via, for example, the remote controller receiver 350.

The processor 300 receives the user selection in step S608. In one embodiment, the processor 300 treats the user selection as a request for the content on demand. In other embodiments, the processor 300 presents the user with an option, for example via the display interface 340 and display 380, to view the selected content on demand (i.e., at a time different from the scheduled time). For example, as illustrated in FIG. 9, when the user selects future content (e.g., "The Office") the user is presented with an option to schedule recording of the future content or to request the content for viewing prior to the scheduled time (e.g., immediately).

After the processor 300 receives the user selection of content in step S608, in step S610 the processor 300 executes a TDO identified by a TDO trigger associated with the selected content. In another embodiment, the processor 300 executes the TDO without use of a separate TDO trigger. The processor 300 executes the associated TDO using the DO engine 312. The execution of the TDO causes the reception apparatus 20 to send a request for the selected content to a predetermined destination (e.g., content source 10 or content server 40) via a first communication medium in step S612. The predetermined destination is defined by the TDO or can be retrieved from a predefined location such as the program description of the selected content in the EPG. In one embodiment, the request for the selected content is sent via the network interface 226 over the Internet. In another embodiment, the request for the selected content is sent via a return channel provided by, for example a cable television provider, a landline telephone provider, cellular telephone provider, etc.

The reception apparatus 20 receives the requested content in step S614 via a second communication medium. The second communication medium may be any communication medium such as a digital television broadcast, the Internet, a dedicated cable channel, a wireless carrier channel (e.g., cellular, wi-fi), etc. When content requested by a plurality of users are provided on the same second communication medium, in one embodiment, a spread spectrum channel is used with each user being identified by a different code.

As an example, a virtual channel listed in the Terrestrial Virtual Channel Table (TVCT) can announce a separate channel associated with a certain service type which carries the requested content. Delivery of the requested content does not, however, need to be on a dedicated channel and can be identified (from a TDO) with certain content Transport Stream ID (TSID) values listed in a Service Map Table (SMT).

In one embodiment, the reception apparatus 20 identifies the requested content received via the second communication medium based on a content identifier or other identifying information defined in the TDO. In another embodiment, the content identifier or other identifying information is provided to the reception apparatus 20 in response to the content request.

In one embodiment, the requested content is provided over a digital television broadcast by inserting the requested content in a IP subnet of a TS provided to the reception apparatus 20. The IP subnet includes one or a combination of one or more Service Signaling Channels (SSC) and one or more File Delivery over Unidirectional Transport (FLUTE) sessions. FLUTE is defined in RFC 3926, which is incorporated by reference in its entirety. Further, the transfer of non-real-time content via an MPEG-2 Transport Stream is described, for example, in ATSC standards A/103:2012 and A/90-A/92, which are incorporated herein by reference in their entirety. In other embodiments, the requested content is provided as a non-real-time service according to other broadcast standards such as the Digital Video Broadcasting (DVB) standards (e.g., a FLUTE session of a DVB broadcast)

Figure 13:
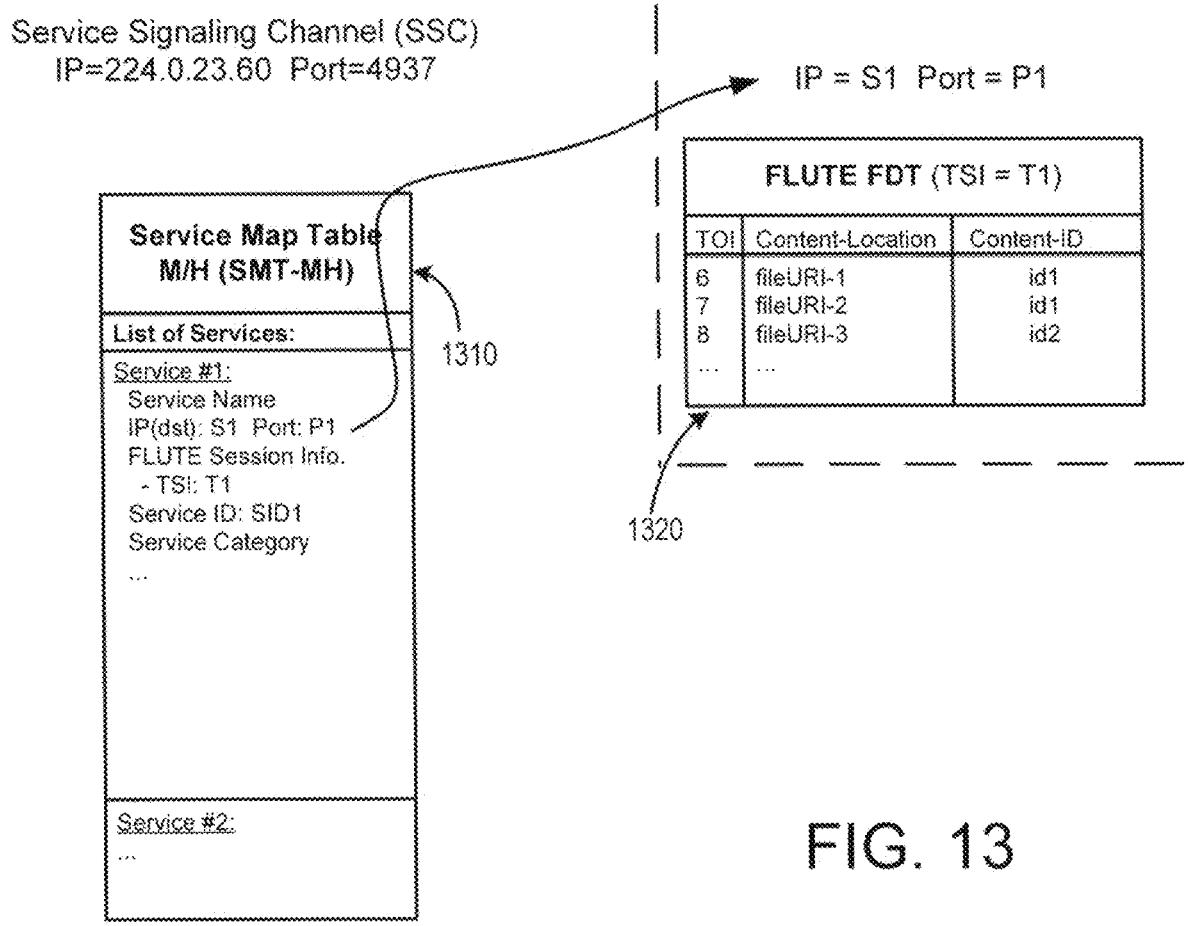
FIG. 13 illustrates an exemplary non-real-time (NRT) service.
Figure 14:
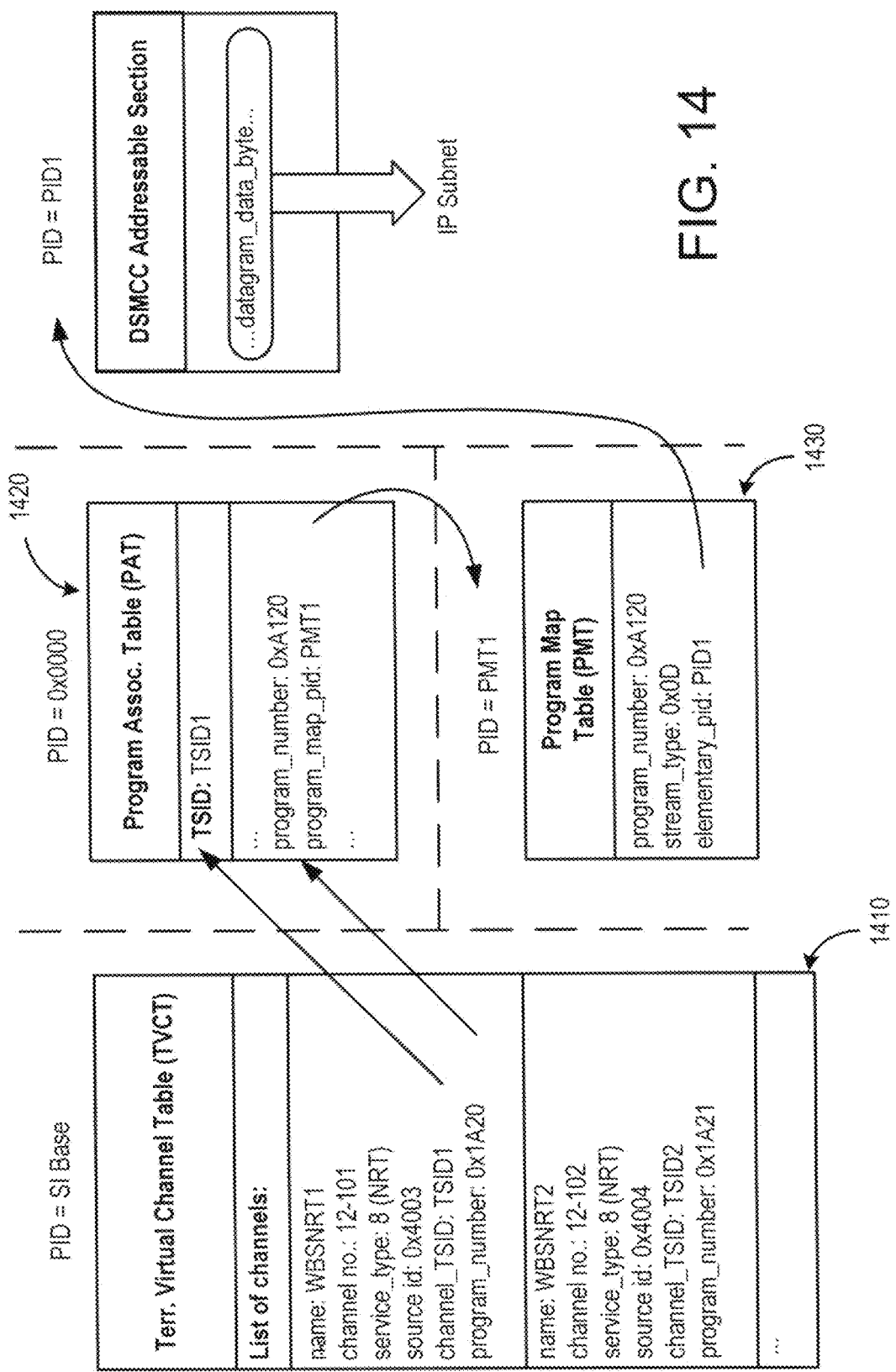
FIG. 14 illustrates tables carried in a service signaling channel (SSC).

For an example broadcast stream delivery, a broadcaster (e.g., content source 10) delivers content in a list of channels (TVCT 1410), as illustrated in FIG. 14. That channel list has pointers to a Program Association Table (PAT) 1420 which lists program numbers and also has pointers to a Program Map Table (PMT) 1430 which lists items in an Internet Protocol (IP) format. This IP format is more universal in nature and allows more devices to understand the table listings. Specific service IDs or Port IDs with IP format are listed in the Service Map Table (SMT) 1310 of FIG. 13 and referenced by that PMT 1430. The service ID points to an IP port number which can be opened to receive a file (e.g., requested content) listed in a FLUTE File Delivery Table (FDT) 1320 via a FLUTE session, thereby delivering a method for the reception apparatus 20 to pick up content. In this example, the requested content is provided as a non-real-time service as defined in ATSC standard A/103.

In one embodiment, when the requested content is provided over a broadcast, the requested content is carried in a TS from a content source that is/was scheduled to distribute the requested content. Alternatively, a dedicated TS can be used to provide the requested content. In this case, the TS may or may not be provided by the same content source.

Further, the requested content may be streamed or provided for download by the reception apparatus 20. For example, the reception apparatus 20 could open a port if the requested content is streamed from the Internet, or store the requested content as one or more files in the memory 310 if received via broadcast or the Internet. It is noted that additional storage capacity is required for the memory 310 in the case that the requested content is downloaded by the reception apparatus 20.

In some embodiments, the requested content may be provided to another device, including a portable device such as a smart phone, by identifying a different destination along with the content request. In one embodiment, the requested content is provided or stored in a cloud-based storage system for access by the user using any one or a plurality of devices.

In some embodiments, the reception apparatus 20 is aware of which communication medium will be used to provide the requested content. For example, the reception apparatus 20 receives a notification of which communication medium will be used to provide the requested content in response to the content request. In another example, the content is provided on a predetermined communication medium. In other examples, the content is provided via a plurality of communication mediums for selective access by the reception apparatus 20 based on any criteria such as whether an Internet connection is available.

Further, in one embodiment, the content request includes information on which communications mediums are accessible to the reception apparatus 20 and the content request is serviced based on this information. For example, the content source 10 may be configured to provide the requested content via the digital television broadcast when an Internet connection is not available to the reception apparatus 20. In another embodiment, the TDO may be configured to cause the content request to be sent to different predetermined destinations based on the available communication mediums or any other capabilities of the reception apparatus 20 (e.g., supported resolutions, etc.)

When the reception apparatus 20 is not aware of which communication medium will be used to provide the requested the content. The reception apparatus 20 checks each available communication medium until the requested content is detected. For example, the processor 300 determines whether the requested content is included in a TS received by television receiver/tuner 330 and data packets received by the network interface 326 based on information that identifies the requested content such as a content identifier. The identification information may be included in the EPG data, the TDO, or provided to the reception apparatus 20 in response to the content request, as described above.

Figure 7:
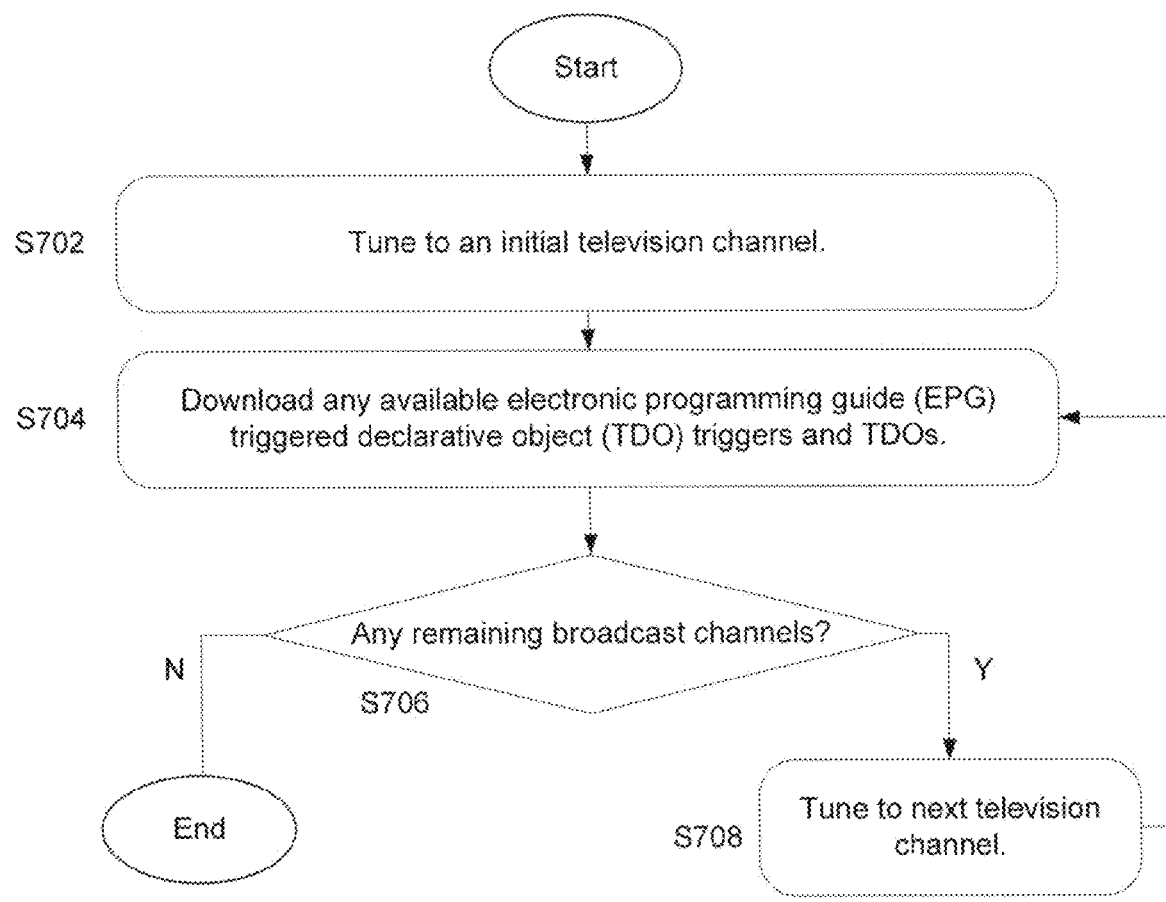
FIG. 7 illustrates a flow diagram of an exemplary method for retrieving triggered declarative objects (TDOs) and associated triggers.

FIG. 7 illustrates a flow diagram of an exemplary method of the reception apparatus 20 for receiving TDO triggers and/or TDOs. The TDO triggers and/or TDOs are updated periodically (e.g., every 30 minutes). In one embodiment, the triggers and/or TDOs are received by a background process when the television receiver/tuner 330 is not being utilized. For example, the background process is performed while the reception apparatus 20 is in a standby mode or during a time a user is viewing content from another source such as a DVD player. In another embodiment, the TDO trigger and/or TDO are received from a television channel currently tuned to by the television receiver/tuner 330.

In step S702, the television receiver/tuner 330 is instructed to tune to an initial channel by, for example, the processor 300. The initial channel may correspond to any channel that can be received by the television receiver/tuner 330. In one embodiment, the processor 300 instructs the television receiver/tuner 330 to tune to a channel based on when the TDO trigger and TDO information was last updated. For example, the television receiver/tuner 330 is tuned to a channel that has not been tuned to for the longest period of time. In another embodiment, the tuning of the television receiver/tuner 330 is prioritized based on how likely a user is to access certain channels.

In step S704, the reception apparatus 20 downloads any available TDO triggers and TDOs being sent over the tuned television channel. For example, the processor 300 extracts any TDO triggers and TDOs from a TS being broadcast on the tuned television channel. The TDO triggers and TDOs may be carried in the IP subnet of the TS, as described above.

In other embodiments, the EPG TDO triggers and/or TDOs are received via other communication mediums such as the Internet or along with the EPG data. For example, an EPG TDO trigger may be embedded in a content description of the EPG data, the reception apparatus 20 may retrieve the EPG TDO triggers and/or TDOs based on one or more destinations identified in the EPG data, in the TS, etc.

In step S706, the processor 300 determines whether any remaining television channels need to be checked. If so, the processor 300 causes the television receiver/tuner 330 to tune to the next channel and returns to step S704.

The EPG includes scheduling information for content provided by one or more content sources for a window of time, and includes past, current, and/or future content. The scheduling information may be available for a predetermined period of time (e.g., a four week window, two weeks in the past and two weeks in the future) that is set by a corresponding content provider or customizable by the user of the reception apparatus 20. In one embodiment, the EPG includes scheduling information for past content, only when one or more past content can be accessed on demand through, for example, the broadcast system 2.

FIGS. 8-11 illustrate examples of the EPG displayed to a user of the reception apparatus 20. In one embodiment, as illustrated in FIG. 8, the EPG includes a current time 802, a program description section 804, a preview section 806, and a schedule section 808. A user navigates the EPG by moving a cursor 810.

When the reception apparatus 20 receives a selection command via, for example, the remote controller receiver 350, in one embodiment the user is presented with any available options for the content identified by the cursor 810. For example, when the cursor 810 identifies future content (e.g., "The Office"), as illustrated in FIG. 8, the reception apparatus 20 displays options such as schedule recording and view now, as illustrated in FIG. 9. When the user selects the view now option, a request for the future content is sent by the reception apparatus 20, as described above. The view now option need not be limited to future content, and can be presented to a user for past content as well as to view a time-shifted version of a current program. For example, the view now option can be used to watch current content from the beginning when the user has already missed a portion of the content being broadcast.

FIG. 10 illustrates another embodiment for presenting available options to a user. For example, when content identified by the cursor 810 is available on demand, the view now option is superimposed over the cursor 810. Subsequently, when the user selects the content, a request for the content is sent by the reception apparatus 20.

FIG. 11 illustrates an embodiment in which the EPG displays an indication of which content is available on demand by displaying a predetermined symbol such as (*). However, any other symbol may be used to identify content as being available on demand. For example, a dollar sign or dollar amount may be used to identify content that is available on demand. Alternatively, content that is available on demand may be displayed in a different color, with a different font, etc.

Figure 12:
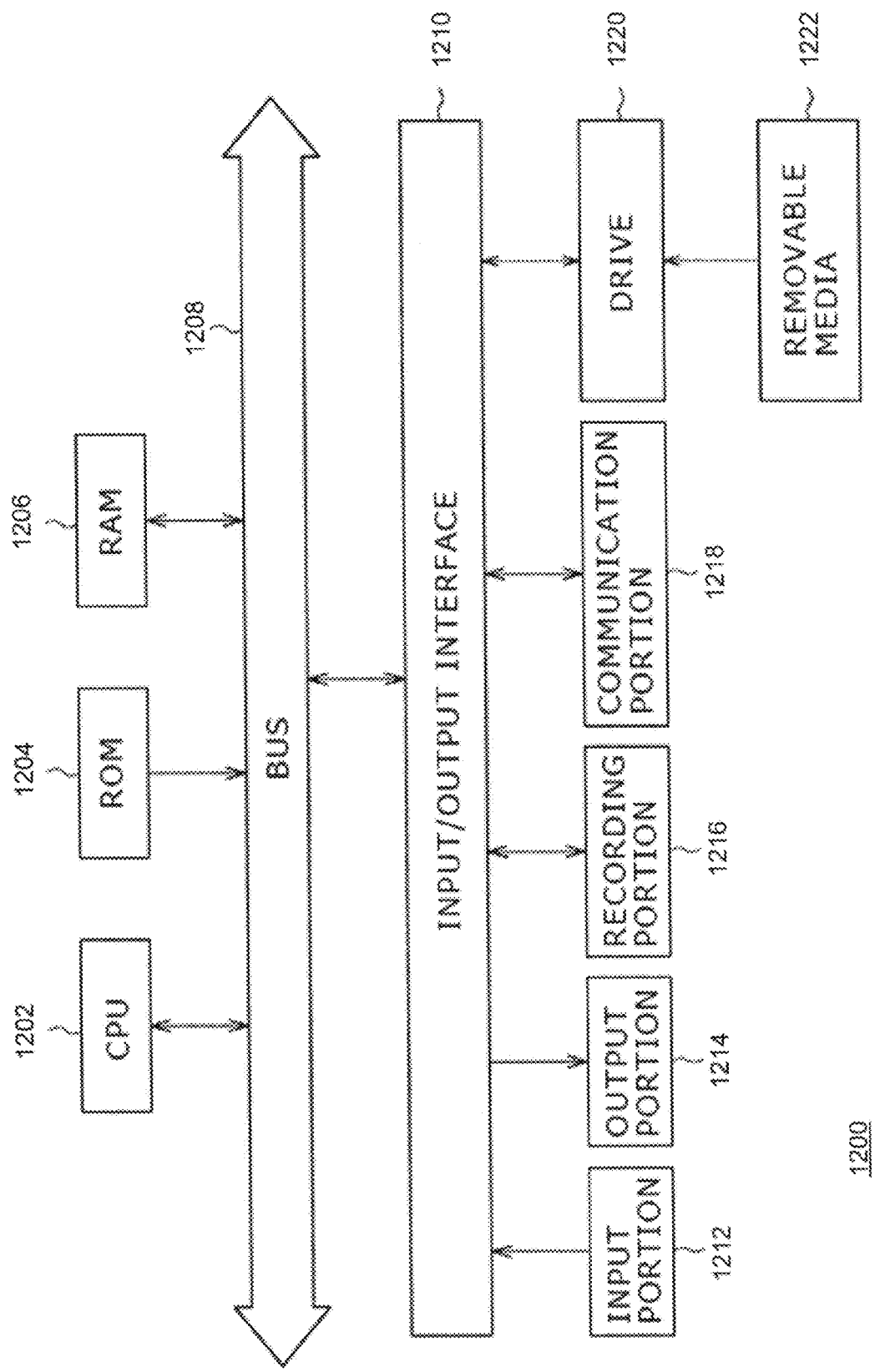
FIG. 12 is an exemplary computer.

FIG. 12 is a block diagram showing an example of a hardware configuration of a computer 1200 that can be configured to function as any one or a combination of the content source 10, reception apparatus 20, content server 40, and information providing apparatus 400.

As illustrated in FIG. 12, the computer 1200 includes a central processing unit (CPU) 1202, read only memory (ROM) 1204, and a random access memory (RAM) 1206 interconnected to each other via one or more buses 1208. The one or more buses 1208 are further connected with an input-output interface 1210. The input-output interface 1210 is connected with an input portion 1212 formed by a keyboard, a mouse, a microphone, remote controller, etc. The input-output interface 1210 is also connected to an output portion 1214 formed by an audio interface, video interface, display, speaker, etc.; a recording portion 1216 formed by a hard disk, a non-volatile memory, etc.; a communication portion 1218 formed by a network interface, modem, USB interface, fire wire interface, etc.; and a drive 1220 for driving removable media 1222 such as a magnetic disk, an optical disk, a magneto-optical disk, a semiconductor memory, etc.

According to one embodiment, the CPU 1202 loads a program stored in the recording portion 1216 into the RAM 1206 via the input-output interface 1210 and the bus 1208, and then executes a program configured to provide the functionality of the one or combination of the content source 10, reception apparatus 20, content server 40, and information providing apparatus 400.

The various processes discussed above need not be processed chronologically and/or in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the invention may be practiced otherwise than as specifically described herein.

The above disclosure also encompasses the embodiments noted below.

(1) A method of a reception apparatus for accessing content, the method including outputting a distribution schedule for a plurality of content; receiving a selection of one of the plurality of content for which distribution started before or starts after a current time; determining, by at least one processor of the reception apparatus, whether on-demand access is requested for the selected content; and when on-demand access is determined to be requested for the selected content, sending a request for the selected content over a first communication medium, and receiving the selected content provided via a second communication medium in response to the request for the selected content.

(2) The method of feature (1), in which the step of outputting includes outputting an electronic programming guide (EPG) including the distribution schedule, the plurality of content including a plurality of television content.

(3) The method of feature (1) or (2), in which, when on-demand access is requested for the selected content, the method further includes executing, by the at least one processor of the reception apparatus, a triggered declarative object (TDO) associated with the selected content, and the step of sending further includes sending the request for the selected content over the first communication medium based on the TDO.

(4) The method of any of features (1) to (3), further including determining whether any of the plurality of content included in the distribution schedule to be output in the step of outputting is associated with a TDO trigger, and in which the step of outputting further includes outputting an indication of which of the plurality of content is associated with a TDO trigger.

(5) The method of feature (3) or (4), in which the step of executing includes executing the TDO identified by a TDO trigger associated with the selected content.

(6) The method of any of features (1) to (5), in which the first communication medium and the second communication medium are the Internet.

(7) The method of any of features (1) to (5), in which the first communication medium is the Internet and the second communication medium is a terrestrial broadcast.

(8) A non-transitory computer-readable storage medium having embedded therein instructions, which when executed by a computer cause the computer to perform a method of a reception apparatus for accessing content, the method including outputting a distribution schedule for a plurality of content; receiving a selection of one of the plurality of content for which distribution started before or starts after a current time; determining, by at least one processor of the reception apparatus, whether on-demand access is requested for the selected content; and when on-demand access is determined to be requested for the selected content, sending a request for the selected content over a first communication medium, and receiving the selected content provided via a second communication medium in response to the request for the selected content.

(9) The non-transitory computer-readable storage medium of feature (8), in which the step of outputting includes outputting an electronic programming guide (EPG) including the distribution schedule, the plurality of content including a plurality of television content.

(10) The non-transitory computer-readable storage medium according to feature (8) or (9), in which, when on-demand access is requested for the selected content, the method further includes executing, by the at least one processor of the reception apparatus, a triggered declarative object (TDO) associated with the selected content, and the step of sending further includes sending the request for the selected content over the first communication medium based on the TDO.

(11) The non-transitory computer-readable storage medium of any of features (8) to (10), further including determining whether any of the plurality of content included in the distribution schedule to be output in the step of outputting is associated with a TDO trigger, and in which the step of outputting further comprises outputting an indication of which of the plurality of content is associated with a TDO trigger.

(12) The non-transitory computer-readable storage medium of feature (10) or (11), in which the step of executing includes executing the TDO identified by a TDO trigger associated with the selected content.

(13) The non-transitory computer-readable storage medium of any of features (8) to (12), in which the first communication medium and the second communication medium are the Internet.

(14) The non-transitory computer-readable storage medium of any of features (8) to (12), in which the first communication medium is the Internet and the second communication medium is a terrestrial broadcast.

(15) A reception apparatus, including a first communication interface; at least one processor configured to output a distribution schedule for a plurality of content, receive a selection of one of the plurality of content for which distribution started before or starts after a current time, determine whether on-demand access is requested for the selected content, and send a request for the selected content over a first communication medium, via the first communication interface, when the at least one processor determines on-demand access is requested for the selected content; and a second communication interface configured to receive the selected content provided via a second communication medium in response to the request for the selected content.

(16) The reception apparatus of feature (15), in which the at least one processor is configured to output an electronic programming guide (EPG) including the distribution schedule, the plurality of content including a plurality of television content.

(17) The reception apparatus of feature (15) or (16), in which the at least one processor is further configured to execute a triggered declarative object (TDO) associated with the selected content when the at least one processor determines on-demand access is requested for the selected content, and send the request for the selected content over the first communication medium based on the TDO.

(18) The reception apparatus of any of features (15) to (17), in which the at least one processor is configured to determine whether any of the plurality of content to be output by the display interface is associated with a TDO trigger, and output an indication of which of the plurality of content is associated with a TDO trigger.

(19) The reception apparatus of feature (17) or (18), in which the at least one processor is configured to execute the TDO identified by a TDO trigger associated with the selected content.

(20) The reception apparatus of any of features (15) to (19), in which the first communication medium and the second communication medium are the Internet, and the first communication interface and the second communication interface are the same.

(21) The reception apparatus of any of features (15) to (19), in which the first communication medium is the Internet and the second communication medium is a terrestrial broadcast.

(22) An information providing apparatus, including a memory configured to store a triggered declarative object (TDO) associated with content which is distributed according to a predetermined schedule; and at least one processor configured to provide the TDO to a reception apparatus via a communication interface, the TDO defining a location from which on-demand access to the content can be requested.

The invention claimed is:
1. A method of a reception apparatus for accessing content, the method comprising:
outputting a distribution schedule interface for display, the distribution schedule interface identifying a plurality of content that is distributed in real-time and predetermined distribution times of the plurality of content;
receiving a selection of one of the plurality of content identified in the displayed distribution schedule interface and for which distribution started before or starts after a current time from a user using the distribution schedule interface;
determine, by circuitry of the reception apparatus, whether on-demand access is requested for the content selected using the distribution schedule interface; and
when on-demand access is determined to be requested for the content selected using the distribution schedule interface,
executing, by the circuitry, a declarative object (DO) for acquiring the content selected using the distribution schedule interface,
sending, by the circuitry, a request for the content selected using the distribution schedule interface over a first communication medium based on the DO, and
receiving the content selected using the distribution schedule interface provided via a second communication medium in response to the request for the content selected using the distribution schedule interface.

2. The method according to claim 1, wherein
the distribution schedule interface includes an electronic programming guide (EPG), and
the plurality of content includes a plurality of broadcast television content.

3. The method according to claim 1, further comprising:
determining whether any of the plurality of content included in the distribution schedule interface to be output in the step of outputting is associated with a DO trigger, wherein
the step of outputting further comprises outputting an indication of which of the plurality of content is associated with a DO trigger.

4. The method according to claim 3, wherein the step of executing comprises:
executing the DO identified by a DO trigger associated with the content selected using the distribution schedule interface.

5. The method according to claim 1, wherein the first communication medium and the second communication medium are the Internet.

6. The method according to claim 1, wherein the first communication medium is the Internet and the second communication medium is a terrestrial broadcast.

7. A non-transitory computer-readable storage medium having embedded therein instructions, which when executed by a computer cause the computer to perform a method of a reception apparatus for accessing content, the method comprising:
   outputting a distribution schedule interface for display, the distribution schedule interface identifying a plurality of content that is distributed in real-time and predetermined distribution times of the plurality of content;
   receiving a selection of one of the plurality of content identified in the displayed distribution schedule interface and for which distribution started before or starts after a current time from a user using the distribution schedule interface;
   determining whether on-demand access is requested for the content selected using the distribution schedule interface; and
   when on-demand access is determined to be requested for the content selected using the distribution schedule interface,
      executing a declarative object (DO) for acquiring the content selected using the distribution schedule interface,
      sending a request for the content selected using the distribution schedule interface over a first communication medium based on the DO, and
      receiving the content selected using the distribution schedule interface provided via a second communication medium in response to the request for the content selected using the distribution schedule interface.

8. The non-transitory computer-readable storage medium according to claim 7, wherein
   the distribution schedule interface includes an electronic programming guide (EPG), and
   the plurality of content includes a plurality of broadcast television content.

9. The non-transitory computer-readable storage medium according to claim 7, further comprising:
   determining whether any of the plurality of content included in the distribution schedule interface to be output in the step of outputting is associated with a DO trigger, wherein
   the step of outputting further comprises outputting an indication of which of the plurality of content is associated with a DO trigger.

10. The non-transitory computer-readable storage medium according to claim 9, wherein the step of executing comprises:
    executing the DO identified by a DO trigger associated with the content selected using the distribution schedule interface.

11. The non-transitory computer-readable storage medium according to claim 7, wherein the first communication medium and the second communication medium are the Internet.

12. The non-transitory computer-readable storage medium according to claim 7, wherein the first communication medium is the Internet and the second communication medium is a terrestrial broadcast.

13. A reception apparatus, comprising:
    a first communication interface;
    circuitry configured to
       output a distribution schedule interface for display, the distribution schedule interface identifying a plurality of content that is distributed in real-time and predetermined distribution times of the plurality of content;
       receive a selection of one of the plurality of content identified in the displayed distribution schedule interface and for which distribution started before or starts after a current time from a user using the distribution schedule interface;
       determine whether on-demand access is requested for the content selected using the distribution schedule interface, and
       when on-demand access is determined to be requested for the content selected using the distribution schedule interface,
          execute a declarative object (DO) for acquiring the content selected using the distribution schedule interface, and
          send a request for the content selected using the distribution schedule interface over a first communication medium, via the first communication interface, based on the DO; and
    a second communication interface configured to receive the content selected using the distribution schedule interface provided via a second communication medium in response to the request for the content selected using the distribution schedule interface.

14. The reception apparatus according to claim 13, wherein
    the distribution schedule interface includes an electronic programming guide (EPG), and
    the plurality of content includes a plurality of broadcast television content.

15. The reception apparatus according to claim 13, wherein the circuitry is configured to
    determine whether any of the plurality of content included in the distribution schedule interface to be output by the circuitry is associated with a DO trigger, and
    output an indication of which of the plurality of content is associated with a DO trigger.

16. The reception apparatus according to claim 15, wherein the circuitry is configured to execute the DO identified by a DO trigger associated with the content selected using the distribution schedule interface.

17. The reception apparatus according to claim 13, wherein
    the first communication medium and the second communication medium are the Internet, and
    the first communication interface and the second communication interface are the same.

18. The reception apparatus according to claim 13, wherein the first communication medium is the Internet and the second communication medium is a terrestrial broadcast.

19. An information providing apparatus, comprising:
    a memory configured to store a declarative object (DO) associated with a particular content which is distributed in real-time and according to a predetermined schedule; and
    circuitry configured to provide the DO to a reception apparatus via a communication interface, the DO defining a location from which on-demand access to the content can be requested, wherein
    the DO is executed by the reception apparatus when on-demand access to the particular content associated with the DO is determined to be requested by a user using a distribution schedule interface displayed to the user, the distribution schedule interface identifying a plurality of content that is distributed in real-time and predetermined distribution times of the plurality of content.

\* \* \* \* \*